(12) United States Patent
Nejezchleb

(10) Patent No.: US 7,163,171 B2
(45) Date of Patent: Jan. 16, 2007

(54) MAGNETIC TAPE CARTRIDGE HAVING A DATA STORAGE MEDIUM CONNECTED TO AN INTEGRAL CLEANING TAPE SECTION

(75) Inventor: Vladimir Nejezchleb, Boulder, CO (US)

(73) Assignee: Quantum Corporation, San Jose, CA (US)

(*) Notice: Subject to any disclaimer, the term of this patent is extended or adjusted under 35 U.S.C. 154(b) by 360 days.

(21) Appl. No.: 10/492,515

(22) PCT Filed: Oct. 15, 2001

(86) PCT No.: PCT/US01/31984

§ 371 (c)(1),
(2), (4) Date: Jul. 12, 2004

(87) PCT Pub. No.: WO03/034432

PCT Pub. Date: Apr. 24, 2003

(65) Prior Publication Data

US 2004/0238672 A1 Dec. 2, 2004

(51) Int. Cl.
*G11B 23/107* (2006.01)
(52) U.S. Cl. .................. 242/348; 360/132
(58) Field of Classification Search ............ 242/348, 242/348.2; 360/132
See application file for complete search history.

(56) References Cited

U.S. PATENT DOCUMENTS

| 3,931,643 A | 1/1976 | Kuroe |
| 5,936,816 A | 8/1999 | Bloomquist et al. |

FOREIGN PATENT DOCUMENTS

| EP | 0315624 A2 | 5/1989 |
| EP | 0617427 A2 | 9/1994 |
| GB | 2262505 A | 6/1993 |
| GB | 2335301 A | 9/1999 |
| JP | 54162532 | 12/1979 |

*Primary Examiner*—John Q. Nguyen
(74) *Attorney, Agent, or Firm*—Morrison & Foerster LLP

(57) ABSTRACT

The present magnetic tape cartridge having a data storage medium connected to an integral cleaning tape section is designed to accommodate the length of cleaning tape in a manner that is compatible with existing tape drive systems. In particular, the hub on the supply reel in the single reel magnetic tape cartridge is dimensioned to accept the length of cleaning tape such that the radial position of the End Of Tape hole in the magnetic tape media occurs in the same position as that of existing single reel magnetic tape cartridges that are not equipped with the length of cleaning tape appended to the magnetic tape media. This enables the cleaning tape equipped magnetic tape cartridge to be compatible with existing tape drive systems.

5 Claims, 2 Drawing Sheets

MAGNETIC TAPE CARTRIDGE HAVING A DATA STORAGE MEDIUM CONNECTED TO AN INTEGRAL CLEANING TAPE SECTION

FIELD OF THE INVENTION

This invention relates to single reel magnetic tape cartridges and to a magnetic tape cartridge that houses a data storage medium with an integral cleaning tape section for use in cleaning the read/write heads in the data storage subsystem.

PROBLEM

It is a problem in the field of tape drive systems to maintain the cleanliness of the read/write heads of the tape drive system, which operation requires the removal of dirt and debris that contaminate the read/write heads. This is especially problematic in the field of removable data storage media, such as single reel magnetic tape cartridges that contain magnetic tape media. Magneto-resistive read/thin film write heads are used to read and record the data on a magnetic tape data storage medium that is housed in the single reel magnetic tape cartridge. A plurality of magneto-resistive read/thin film write heads and their associated electronics are typically grouped into a single physical read/write head apparatus so that a plurality of closely spaced tracks can be concurrently written and read on the data storage media. This read/write head apparatus is mounted on a movable carriage mechanism that functions to position the magneto-resistive read/thin film write heads over a selected set of tracks on the magnetic tape media. The magneto-resistive read/thin film write heads must be in close contact with the magnetic tape media to work properly and a small amount of dirt and/or debris on the magneto-resistive read/thin film write heads can interfere with the reading/writing of data on these closely spaced tracks of data on the magnetic tape media.

Typical symptoms of the need to clean the magneto-resistive read/thin film write heads can vary from increased noise level in the read/write signals to a complete loss of the read/write signal. While cleaning the magneto-resistive read/thin film write heads can be accomplished by hand cleaning of the heads with a cleaning solvent, this requires taking the tape drive system out of service and partially disassembling the tape drive system to obtain access to the magneto-resistive read/thin film write heads. In the situation where the tape drive system is part of an automated tape cartridge library system, the access to the tape drive and the subsequent access to the magneto-resistive read/thin film write heads in the tape drive system can be time consuming and costly in terms of tape drive system down time and the labor involved.

Cleaning tape cartridges have been used to clean the dirt and debris from the magneto-resistive read/thin film write heads. However, these cleaning tape cartridges require the user to remove the presently executing magnetic tape cartridge from the tape drive system. This requires that the magnetic tape media be rewound into the single reel magnetic tape cartridge and the single reel magnetic tape cartridge then ejected from the tape drive system. The user must then load the cleaning tape cartridge into the tape drive. The cleaning operation is then executed and the cleaning tape is rewound on to the cleaning tape cartridge before the cleaning tape cartridge is ejected from the tape drive. This process is time consuming and requires the use of a specialty cleaning tape cartridge.

In order to avoid the need for a specialty cleaning tape cartridge, it is possible to include a section of cleaning tape in the single reel magnetic tape cartridge so that the magneto-resistive read/thin film write heads can be cleaned without removing the single reel magnetic tape cartridge from the tape drive. U.S. Pat. No. 5,936,816 teaches a process where a single reel magnetic tape cartridge can be implemented with a length of magnetic tape media to which is appended a length of cleaning tape which has an abrasive cleaning characteristic. The length of cleaning tape is a trailing leader that is interposed between the magnetic tape media and the tape reel. In order to effectively use the length of cleaning tape, the magnetic tape media is fully unreeled to expose the abrasive leader. This operation only occurs when the tape drive system detects a data error rate that is in excess of a predetermined threshold. The tape drive system than halts the data read/write operation and spools forward to the trailing leader to clean the magneto-resistive read/thin film write heads. Once the cleaning operation is completed, the tape drive rewinds the tape back to the location on the magnetic tape media where the data read/write operation was halted. The data read/write operation is then reinitiated. During normal operation of the tape drive system, the trailing leader is not exposed to the magneto-resistive read/thin film write heads, but instead remains on the supply reel to thereby prevent unnecessary contact with the abrasive surface and the associated wear on the magneto-resistive read/thin film write heads.

A problem with the use of a single reel magnetic tape cartridge that includes an integral cleaning tape is that there are a large number of tape drive systems that cannot accommodate such a tape cartridge. This is due to the fact that the tape drive system expects to encounter a physical feature on the magnetic tape media, such as an End Of Tape (EOT) hole which delimits the approach of the Physical End Of Tape (PEOT). Tape drives that use this feature can stop in a distance that is shorter than the distance between the End Of Tape (EOT) hole and the Physical End Of Tape (PEOT). Where a short section of cleaning tape is added to the Physical End Of Tape (PEOT), the original length of the tape is extended by the length of the cleaning tape to a New Physical End Of Tape (NPEOT). In existing tape drives, the radius at which the End Of Tape (EOT) hole occurs with the short section of cleaning tape added to the Physical End Of Tape (PEOT) differs from the expected radius and that tape drive system generates an error indication. In addition, the thickness of the magnetic tape media is a critical dimension and existing single reel tape cartridges are equipped with a standard length of magnetic tape media that represents the maximum length of magnetic tape media that can be accommodated on the single reel magnetic tape cartridge. The addition of a length of trailing leader, with its additional thickness is not anticipated in the design of the existing single reel magnetic tape cartridges.

Thus, there is presently no simple solution that addresses the need to maintain the cleanliness of the read/write heads of the tape drive system, which operation requires the removal of dirt and debris that contaminate the read/write heads.

SOLUTION

The above-described problems are solved and a technical advance achieved by the present magnetic tape cartridge having a data storage medium connected to an integral cleaning tape section, termed "cleaning tape equipped magnetic tape cartridge" herein, which is designed to accommodate the length of cleaning tape in a manner that is compatible with existing tape drive systems. In particular, the hub on the supply reel in the single reel magnetic tape cartridge is dimensioned to accept the length of cleaning tape such that the radial position of the End Of Tape hole in the magnetic tape media occurs in the same position as that of existing single reel magnetic tape cartridges that are not equipped with the length of cleaning tape appended to the magnetic tape media. This enables the cleaning tape equipped magnetic tape cartridge to be compatible with existing tape drive systems.

DETAILED DESCRIPTION OF THE DRAWINGS

Figure 1:
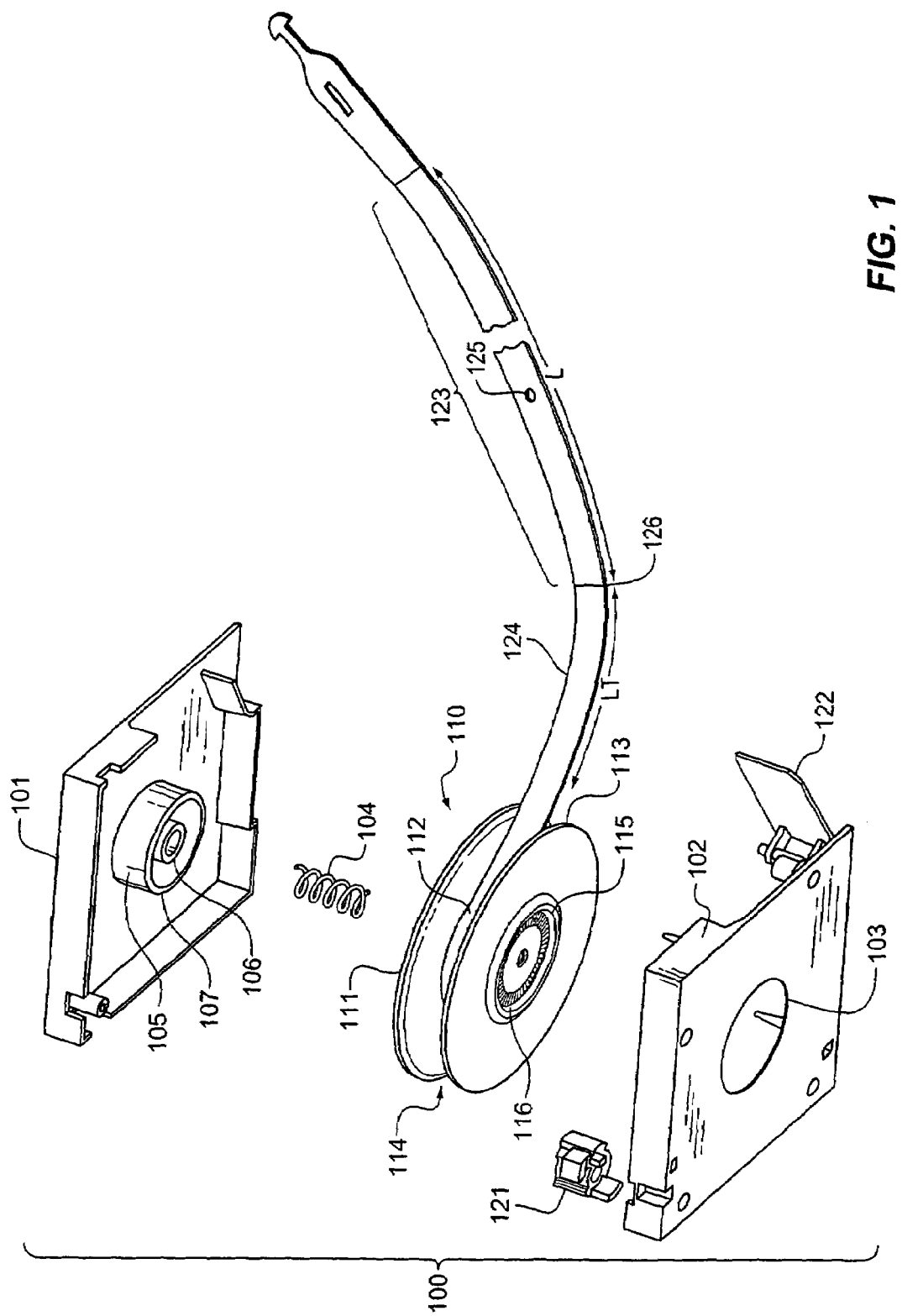
FIG. 1 illustrates, in perspective view, the architecture of the present cleaning tape equipped magnetic tape cartridge.

For purposes of illustration and not of limitation, various features and advantages of the present invention will now be described within the context of a single reel DLT tape cartridge. It is to be understood that the following description with respect to a DLT tape cartridge is not intended to limit the scope of the present invention. It would be obvious to one skilled in the art that the principles of the present invention could be easily applied to other tape cartridge formats.

Digital data is stored on magnetic tape by tape drive systems that use a variety of designs, but in all cases, magnetic tape media is wound between a pair of magnetic tape reels as data is transferred to or from the magnetic tape medium. In the art of data storage, the physical space required to store data is an important concern. To conserve space, magnetic tape drives often use a single reel magnetic tape cartridge design. The single reel design utilizes a supply reel located within the magnetic tape cartridge and a take-up reel located within the tape drive system. After the magnetic tape cartridge is inserted into the tape drive system, the magnetic tape media is connected to the take-up reel and wound along a magnetic tape path internal to the tape drive system.

One example of a magnetic tape path is a guide roller tape path located between the supply reel and the take-up reel. The guide roller tape path uses a plurality of guide rollers to guide the magnetic tape media as it is wound between the supply reel and the take-up reel. Guide roller tape paths have the advantage of reducing friction in the tape path to that of rolling friction caused by components such as ball bearings.

A magneto-resistive read/write head, or "read/write head" as it is commonly referred to in the art, located in the tape path, reads and writes digital data as the magnetic tape media passes over the read/write head. The digital data is written and read from the magnetic tape media in tracks running in a longitudinal direction relative to the magnetic tape media. To read or write data on a specific track, the magneto-resistive read/write head must align with that track as the magnetic tape media passes over the magneto-resistive read/write head. To prevent errors in reading and writing data, the tape path traveled by the magnetic tape media must be reproducible with a high degree of accuracy, with the term tracking being defined as the alignment of the magneto-resistive read/write head with an individual track on the magnetic tape media.

Improvements in the art of magneto-resistive read/write heads have increased the number of tracks that can be included on magnetic tape media. As a result, individual tracks are narrower and require higher tolerances of tape path reproducibility to maintain alignment of a desired track with the magneto-resistive read/write head. Alignment of a specific tape track with the magneto-resistive read/write head is especially critical during data writing because a misalignment can result in writing over data contained on adjacent tracks. In addition, the magneto-resistive read/thin film write heads must be in close contact with the magnetic tape media to work properly and a small amount of dirt and/or debris on the magneto-resistive read/thin film write heads can interfere with the reading/writing of data on these closely spaced tracks of data on the magnetic tape media. As the magnetic tape traverses the tape path, noted above, it can be contaminated by dirt or debris that is present in the tape drive system, which dirt and debris can be deposited on the magneto-resistive read/thin film write heads. Typical symptoms of the need to clean the magneto-resistive read/thin film write heads can vary from increased noise level in the read/write signals to a complete loss of the read/write signal.

Figure 2:
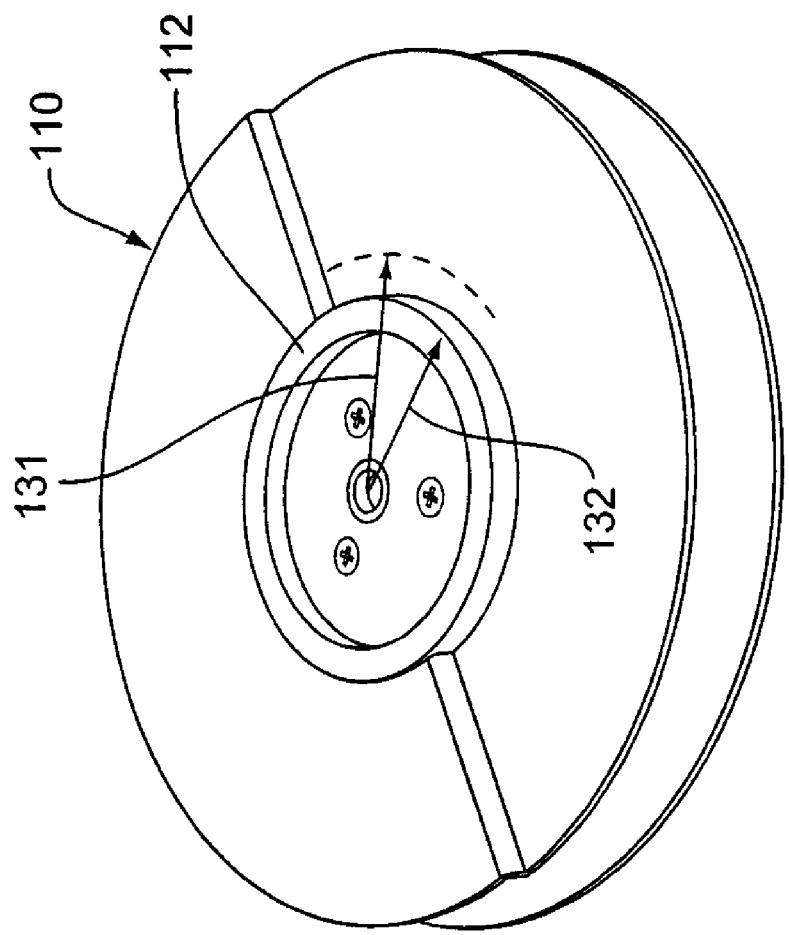
FIG. 2 illustrates a top plan view of the supply reel used in the present cleaning tape equipped magnetic tape cartridge.

FIG. 1 illustrates, in perspective view, the architecture of the present cleaning tape equipped magnetic tape cartridge, and FIG. 2 illustrates a top plan view of the supply reel used in the present cleaning tape equipped magnetic tape cartridge. The tape cartridge 100 consists of a two-part housing that includes a top section 101 and a bottom section 102 for enclosing the tape reel 110 and its associated magnetic tape 123. The tape reel 110 comprises a top flange 111 connected to a top portion of a tape reel hub 112 and a bottom flange 113 connected to a bottom portion of the tape reel hub 112. The tape reel hub 112 could be a conventional tape reel hub that connects to the tape drive in a conventional manner. The top and bottom flanges, 111 and 113, are connected in a parallel relationship and form a magnetic tape media containment section 114 on the tape reel hub 112. The tape media containment section 114 guides the tape media around the tape reel hub 112 during operation of the tape drive.

The magnetic tape media 123 contains an End Of Tape (EOT) hole 125 which delimits the approach of the Physical End Of Tape (PEOT). Tape drive systems that use this feature can stop in a distance that is shorter than the distance between the End Of Tape (EOT) hole and the Physical End Of Tape (PEOT). In addition to detecting the End Of Tape (EOT) hole 125, the tape drive system tracks the amount of magnetic tape media 123 that has been unwound from the tape reel hub 112 and expects that the End Of Tape hole will appear at a point close to the radius 131 of a standard sized tape reel hub. In the prior art, where a short section of cleaning tape 124 is added between the hub 112 and the magnetic tape media 123, the original length L of the tape is extended by the length LT of the cleaning tape 124 to a New Physical End Of Tape (NPEOT). In existing tape drives, the radius at which the End Of Tape EOT hole 125 occurs with the short section of cleaning tape 124 added to the magnetic tape media 123 differs from the expected radius, which is the radius 131 of the standard tape reel hub 112.

The present cleaning tape equipped magnetic tape cartridge adds a short section of cleaning tape 124 to the magnetic tape media 123, which extends the original length L of the tape by the length LT of the cleaning tape to a New Physical End Of Tape (NPEOT). The cleaning tape 124 consists of a leader that has an abrasive coating applied to a surface thereof to enable the abrasive surface to clean dirt and debris from the magneto-resistive read/thin film write heads. The cleaning tape 124 can be of thickness and stiffness greater than the magnetic tape media 123 to support the head cleaning function. The present cleaning tape equipped magnetic tape cartridge makes use of a reduced radius 132 tape reel hub 112, with the reduction in the radius 132 being sufficient to fully accommodate the length LT of cleaning tape 124 such that the radius at which the End Of Tape (EOT) hole 125 occurs is the same as with standard magnetic tape cartridges that are not equipped with the length of cleaning tape 124 and are equipped with a standard tape reel hub. This enables the cleaning tape equipped magnetic tape cartridge to be compatible with existing tape drive systems, since the End Of Tape (EOT) hole 125 occurs at the expected position and the radius of the tape reel hub 112 differs from a radius of a standard tape reel hub 112 by an amount that substantially matches a radius difference that corresponds to the thickness of the length of cleaning tape 124 when wrapped around the tape reel hub 112.

SUMMARY

The present magnetic tape cartridge having a data storage medium connected to an integral cleaning tape section is designed to accommodate the length of cleaning tape, with the hub on the supply reel being dimensioned to accept the length of cleaning tape such that the radial position of the End Of Tape hole in the magnetic tape media occurs in the same position as that of existing single reel magnetic tape cartridges that are not equipped with the length of cleaning tape appended to the magnetic tape media.

What is claimed:

1. A single reel tape cartridge that is configured to be loadable into a tape drive to read and write data on magnetic tape media that is wound on the single reel tape cartridge, the single reel tape cartridge comprising:
   a tape reel comprising:
      a hub,
      a first flange connected to a top of the hub,
      a second flange connected to a bottom of the hub in a parallel relationship with the first flange, wherein the first flange and the second flange define a tape containment section between said first and second flanges;
   a housing for enclosing said tape reel;
   a length of magnetic tape media having a first end and a second end;
   a length of cleaning tape interposed between said second end of said length of magnetic tape media and said hub; and
   wherein said hub is of a radius to accommodate wrapping of said length of cleaning tape on said hub to position said second end of said length of magnetic tape media at a hub radius that is consistent with an existing hub radius for a tape reel having said length of magnetic tape media wound thereon.

2. The single reel tape cartridge of claim 1 further comprising:
   wherein said length of cleaning tape contains an abrasive affixed to a surface thereof.

3. The single reel tape cartridge of claim 1 further comprising:
   wherein said length of cleaning tape comprises a leader having a thickness and stiffness greater than said length of magnetic tape media.

4. The single reel tape cartridge of claim 1 further comprising:
   said first end of said length of magnetic tape media comprises a leader used by said tape drive to withdraw said magnetic tape media from said tape cartridge.

5. The single reel tape cartridge of claim 1 further comprising:
   wherein said radius of said hub differs from a radius of a standard tape reel hub by an amount that substantially matches a radius difference that corresponds to the thickness of said length of cleaning tape when wrapped around said hub.

* * * * *